Patented July 18, 1939

2,166,150

UNITED STATES PATENT OFFICE 2,166,150

CATALYTIC HYDROGENATION OF DINITRILES TO DIAMINES

Benjamin W. Howk, Wilmington, Del., assignor to E. I. du Pont de Nemours & Company, Wilmington, Del., a corporation of Delaware No Drawing. Application November 15, 1935, Serial No. 49,973

12 Claims. (Cl. 260—583)

This invention relates to catalytic processes and more particularly it relates to processes for the liquid phase catalytic hydrogenation of nitriles to amines. More specifically this invention relates to the liquid phase hydrogenation of the nitriles of aliphatic dibasic acids to aliphatic diamines with a suitable active hydrogenation catalyst such as nickel.

The literature contains many references to laborious and inefficient methods for the preparation of diamines. Among these, the sodium reduction of dinitriles, the hypochlorite degradation of diamides and the reaction of dihalides with ammonia might be mentioned as typical. Most of these processes involve the use of aqueous solutions, salts, etc. from which it is extremely difficult to isolate the diamines in pure form. My invention utilizes an economical hydrogenation process to form the diamine which is isolated in a very pure form by simple fractional distillation.

This invention has as an object the preparation of useful aliphatic diamines by the catalytic hydrogenation of the nitriles of dibasic acids over suitable hydrogenation catalysts, preferably in the presence of ammonia.

This object is accomplished by means of the following invention which comprises charging the nitrile of an aliphatic dibasic acid, with or without a solvent, a hydrogenation catalyst such as nickel, and preferably an excess of dry ammonia into an agitated autoclave capable of withstanding high temperatures and pressures. Hydrogen is admitted to the autoclave under pressure and the mixture heated with stirring. Hydrogenation takes place at temperatures within the range from 25° C. to 200° C. and is complete when the absorption of hydrogen ceases.

The following are examples of typical nickel catalysts that may be used in the process described herein.

Example A

An active nickel catalyst suitable for the hydrogenation of dinitriles to diamines is prepared by the following procedure: 35 grams of sodium metasilicate is dissolved in 875 cc. of water and the solution made barely acid by adding 22 cc. of concentrated nitric acid (73%). To this slightly acid silicate solution is added in succession 700 cc. of nickel nitrate solution containing 70 grams of nickel, and 140 grams of magnesia alba. The mixture is thoroughly stirred to produce a uniform suspension and 5600 cc. of 5% sodium bicarbonate solution is poured into it. The resulting slurry is coagulated by a few minutes boiling after which it is filtered, washed, dried in an oven at 110° C., and finally calcined at 450° C. for several hours to form a fine, pale green powder. An extremely active hydrogenation catalyst is produced by heating this powder at 460–475° C. in a stream of reducing gas such as hydrogen. The elementary nickel in this catalyst exists in an extremely fine state of subdivision as indicated by its pyrophoric nature and activity in promoting hydrogenation reactions.

Example B

Another type of nickel catalyst is made by a procedure somewhat as follows: 80 parts of 5% sodium bicarbonate solution is added to a suspension of 1.5 parts of natural, untreated kieselguhr in 22.5 parts of a solution containing 2 parts of nickel nitrate and 0.5 part of sodium silicate. Nickel carbonate admixed with some nickel silicate is precipitated on the surface of the kieselguhr. This mixture is filtered, washed, dried and the nickel salts reduced to elementary nickel by heating in a rapid stream of hydrogen at 460–475° C. over a period of two or three hours. The resulting catalyst powder is quite effective in promoting hydrogenation reactions and is particularly useful in the hydrogenation of dinitriles to diamines.

The following examples illustrate preferred methods of carrying out the applicant's invention.

Example 1

One hundred grams of suberonitrile, 50 cc. of methanol, 50 grams of anhydrous ammonia, and 10 grams of nickel catalyst are charged into an autoclave and heated to a temperature of 90° to 100° C. Thereafter, hydrogen is admitted to the autoclave until the total pressure is within the range from 1000–2000 pounds per square inch. Hydrogen is absorbed over a period of one hour and ten minutes.

The cooled tube is evacuated and the product, which is isolated by fractional distillation, is octamethylene diamine, a white crystalline solid, b. p. 121° to 122° C./18 mm. The yield is 90 grams corresponding to a conversion of 85 per cent.

Example 2

Two thousand grams of sebaconitrile, 750 grams of methanol, 700 grams of ammonia, and 300 grams of nickel catalyst are charged into an autoclave equipped with a mechanical stirring device. Hydrogen is forced into the vessel until the total pressure is within the range from 1000–1800 pounds per square inch and the mixture is heated to 110° to 115° C. Hydrogen is absorbed over a period of 3.0–3.5 hours and thereafter ceases. The autoclave is cooled, the contents removed, and the catalyst filtered. The product is isolated by fractional distillation of the catalyst-free solution whereby 1680 grams of decamethylene diamine, a white solid, m. p. 60° C., b. p. 139° to 140° C./12 mm., is obtained. The conversion is 80 per cent. Decamethylene diamine is essentially insoluble in water but reacts readily with carbon dioxide to form a carbonate.

Although in the above examples I have indicated certain definite conditions of temperature, pressure, concentrations, times of reaction, catalysts, etc., it is to be understood that these values may be varied somewhat within the scope of this invention, since the conditions of each experiment are determined by the material under treatment and the catalyst employed. In general, the processes of this invention are operable within the temperature range from 25° C. to 200° C. and at pressures ranging from atmospheric to a maximum determined by the practical limitations of the vessel used in carrying out the reaction. It is advisable, however, to maintain a pressure higher and a temperature lower than the corresponding critical values for ammonia, in order to preserve that essential ingredient in the liquid phase. I prefer to operate at a temperature of 50° to 120° C. and under total pressures of 500–4000 pounds per square inch. The quantity of ammonia used may be varied considerably but, since it is probable that it may react with the nitrile group prior to hydrogenation or after partial hydrogenation to an aldimine, it is preferable to use in excess of at least two moles of ammonia for each mole of dinitrile.

Although the processes of my invention do not require the use of a solvent, I may add alcohols, ethers, hydrocarbons, etc., to the hydrogenation mixture without materially affecting the yield of product. Oftentimes it is desirable to utilize a small proportion of solvent, since it appears that this condition promotes the speed and ease of the hydrogenation reaction. I have found that methanol offers many advantages for this purpose. It is completely miscible with all dinitriles and most of the corresponding diamines, thereby facilitating the charging and evacuation of the reaction vessel as well as the removal of the spent catalyst. The hydrogenation reaction occurs at a temperature low enough to avoid undesirable methylation of the product. Moreover, methanol thoroughly wets the catalyst and acts to remove small traces of water that often exert an inhibitory effect in the presence of water-immiscible solvents such as benzene or cyclohexane. In general, methanol appears to promote a better contact between the catalyst, hydrogen and hydrogen acceptor. From the standpoint of cost, purity and ease of recovery it is superior to other solvents.

The type and amount of catalyst employed in this invention is determined by the kind of products desired. Pyrophoric or stabilized nickel catalysts either in the massive state or supported on suitable powdered materials such as kieselguhr or pumice are most effective in producing a rapid hydrogenation of nitriles with a maximum yield of primary amines. I may also use other hydrogenating metals and their oxides, such as reduced cobalt, copper or zinc compounds commonly referred to as hydrogenation catalysts. These catalysts are, however, less active than nickel, require a longer time of hydrogenation, and tend to produce a higher yield of secondary and tertiary amines. The processes of this invention as applied to the dinitriles of such dibasic acids as sebacic and suberic are described in the foregoing examples, but in general, the process may be utilized for the conversion of open-chain dinitriles containing from 8 to 10 carbon atoms to the corresponding diamines.

My invention offers many advantages over the prior art from the standpoint of economy and efficiency. It comprises a novel and effective catalytic hydrogenation process whereby aliphatic dinitriles are converted to the corresponding aliphatic primary diamines with a minimum of undesirable side reactions such as the formation of cyclic imines or polymeric amines. The pure anhydrous aliphatic diamines are recovered from the reaction mixture in high yields by a simple fractional distillation process. The use of ammonia in my process is especially advantageous since it contributes to the smoothness and completeness of the reaction, and tends to decrease the yield of undesirable by-products which are otherwise produced.

The diamines of this invention are of interest as detergent, emulsifying agent and textile assistant intermediates, corrosion inhibitors, flotation agents and insecticides, etc. They may also be employed in the synthesis of polymeric amides, polymeric amino resins, and to modify other resins that are used in the manufacture of plastics, coating compositions and the like. Certain of these diamines are of interest as absorbents for toxic acidic gases, as antioxidants for rubber and gasoline, and as dispersing agents for pigments in paints and carbon black in rubber. Moreover, diamines may be used in the formation of dyes and because of a definite physiological effect they are potentially of interest as pharmaceuticals and pharmaceutical ingredients.

Since many apparently and widely different embodiments of this invention may be made without departing from the spirit and scope thereof, it is to be understood that I do not limit myself to the specific embodiments thereof, except as defined in the following appended claims.

I claim:

1. The process for the production of diamines which comprises catalytically hydrogenating in the liquid phase in the presence of ammonia a dinitrile of a non-hydroxylated dibasic acid, containing from eight to ten carbon atoms in a straight chain, at a temperature within the range of 25° C. to 200° C.

2. The process in accordance with claim 1 characterized in that the reaction is carried out at a temperature of about 50° to about 120° C.

3. The process in accordance with claim 1 characterized in that the reaction is carried out at a pressure of about 500 to about 4000 pounds per square inch.

4. The process in accordance with claim 1 characterized in that the compound is hydrogenated while in solution in an organic solvent.

5. The process in accordance with claim 1 characterized in that the compound is hydrogenated while in solution in methanol.

6. The process in accordance with claim 1 characterized in that the compound being hydrogenated is a dinitrile of an aliphatic dibasic acid containing from eight to ten carbon atoms.

7. The process for the production of diamines which comprises catalytically hydrogenating in the liquid phase a dinitrile of an aliphatic non-hydroxylated dibasic acid, containing from 8 to 10 carbon atoms in a straight chain, in the presence of ammonia at a temperature within the range of 25° C. to 200° C.

8. The process for the production of diamines which comprises reacting in the liquid phase a dinitrile of an aliphatic non-hydroxylated dibasic acid, containing from 8 to 10 carbon atoms in a straight chain, with hydrogen in the presence of ammonia and a nickel catalyst at a temperature within the range of 25° C. to 200° C.

9. The process for the production of diamines which comprises reacting in the liquid phase suberonitrile with hydrogen in the presence of ammonia and a nickel catalyst at a temperature within the range of 25° C. to 200° C.

10. The process for the production of diamines which comprises reacting in the liquid phase suberonitrile in solution in methanol with hydrogen in the presence of ammonia and a nickel catalyst at a temperature of about 90° to about 100° C. and at a pressure of about 1000 to about 2000 pounds per square inch.

11. The process for the production of diamines which comprises reacting in the liquid phase sebaconitrile with hydrogen in the presence of ammonia and a nickel catalyst at a temperature within the range of 25° C. to 200° C.

12. The process for the production of diamines which comprises reacting in the liquid phase sebaconitrile in solution in methanol with hydrogen in the presence of ammonia and a nickel catalyst at a temperature of about 110° to about 115° C. and at a pressure of about 1000 to about 1800 pounds per square inch.

BENJAMIN W. HOWK.